US009158982B2

(12) United States Patent
Nordbryhn

(10) Patent No.: US 9,158,982 B2
(45) Date of Patent: Oct. 13, 2015

(54) SYSTEM AND METHOD FOR IMAGING AN OBJECT

(75) Inventor: Andreas Nordbryhn, Oslo (NO)

(73) Assignee: TOMRA SYSTEMS ASA, Asker (NO)

( * ) Notice: Subject to any disclaimer, the term of this patent is extended or adjusted under 35 U.S.C. 154(b) by 121 days.

(21) Appl. No.: 14/128,304

(22) PCT Filed: Jun. 22, 2012

(86) PCT No.: PCT/NO2012/050114
§ 371 (c)(1),
(2), (4) Date: Mar. 18, 2014

(87) PCT Pub. No.: WO2012/177145
PCT Pub. Date: Dec. 27, 2012

(65) Prior Publication Data
US 2014/0185960 A1 Jul. 3, 2014

(30) Foreign Application Priority Data
Jun. 24, 2011 (EP) .................................... 11171366

(51) Int. Cl.
G06K 9/00 (2006.01)
G06K 9/20 (2006.01)
G06K 7/10 (2006.01)
G06K 7/12 (2006.01)

(52) U.S. Cl.
CPC .......... *G06K 9/2027* (2013.01); *G06K 7/10732* (2013.01); *G06K 7/10831* (2013.01); *G06K 7/12* (2013.01); *G06K 2207/1018* (2013.01)

(58) Field of Classification Search
None
See application file for complete search history.

(56) References Cited

U.S. PATENT DOCUMENTS

| 5,278,397 A | 1/1994 | Barkan |
| 5,279,397 A | 1/1994 | Hartland |
| 5,883,376 A * | 3/1999 | Rosch et al. .................. 235/492 |

(Continued)

FOREIGN PATENT DOCUMENTS

| EP | 0932877 | * | 2/2003 |
| WO | WO 98/18099 A1 | | 4/1998 |
| WO | WO 2010/081556 A1 | | 7/2010 |

OTHER PUBLICATIONS

International Search Report (PCT/ISA/210) mailed on Sep. 21, 2012 by the Norwegian Patent Office as the International Searching Authority for International Application No. PCT/NO2012/050114.

(Continued)

*Primary Examiner* — Andrae S Allison
(74) *Attorney, Agent, or Firm* — Buchanan Ingersoll & Rooney P.C.

(57) ABSTRACT

A system for imaging an object, the system including: a detection zone; a first unit adapted to selectively emit radiation of at least one first wavelength and radiation of at least one second, different wavelength for at least partly illuminating the object in the detection zone; a second unit adapted to capture at least partial images of the illuminated object; and an aperture placed in an optical path between the detection zone and the second unit. The aperture includes: a first, central area adapted to transmit radiation of at least the first wavelength(s) and the second wavelength(s); and a second area surrounding said first area, which second area is adapted to block radiation of the second wavelength(s), but transmit radiation of the first wavelength(s). Also, an imaging method, and use of a diaphragm in a reverse vending machine.

12 Claims, 5 Drawing Sheets

(56) References Cited

U.S. PATENT DOCUMENTS

| | | | |
|---|---|---|---|
| 6,050,622 A * | 4/2000 | Gustafson | 292/307 R |
| 6,876,392 B1 * | 4/2005 | Uomori et al. | 348/348 |
| 7,119,842 B2 | 10/2006 | Seo | |
| 9,036,080 B2 * | 5/2015 | Miyawaki | 348/374 |
| 2002/0186976 A1 * | 12/2002 | Seo | 396/429 |
| 2004/0179725 A1 * | 9/2004 | Nordbryhn et al. | 382/142 |
| 2005/0077470 A1 * | 4/2005 | Tichit et al. | 250/341.8 |
| 2012/0008023 A1 * | 1/2012 | Wajs | 348/273 |
| 2014/0185960 A1 * | 7/2014 | Nordbryhn | 382/321 |
| 2014/0218510 A1 * | 8/2014 | Nordbryhn | 348/131 |

OTHER PUBLICATIONS

European Search Report issued on Nov. 2, 2011.

* cited by examiner

SYSTEM AND METHOD FOR IMAGING AN OBJECT

FIELD OF USE

The present disclosure relates to a system for imaging an object, an imaging method, and use of a diaphragm in a reverse vending machine.

BACKGROUND

An object, such as a can or bottle, that is returned to a reverse vending machine (RVM) is usually provided with different marks or patterns that should be analyzed or recognized by the RVM. Such marks can be bar codes, article numbers, particular deposit marks, etc. Different patterns can have different sizes, or require different resolutions to be detected by e.g. a camera. For instance, a finer pattern requires high resolution, while a coarser pattern can be properly detected even with lower resolution. Also, the distance between the object and the camera may be unknown, albeit the distance is typically within a given interval. Hence, the camera's depth of field should generally cover said interval in which the object may appear.

Unrelated to RVMs, U.S. Pat. No. 7,119,842 (Soe) discloses a diaphragm which is mounted in a photographing optical system and which forms a first area and a second area. The first area transmits light rays of the infrared and visible rays spectrum. The second area selectively transmits either of light rays of the infrared or visible rays spectrum. The second area is partly defined by an iris stop. When the second area transmits infrared, the first and second areas together determine the amount of infrared rays reaching a three-dimensional image-capturing CCD. For the visible rays of incident light, the first area determines the amount of rays reaching a two-dimensional image-capturing CCD. With the construction in U.S. Pat. No. 7,119,842, a two-dimensional image of the visible rays and a three-dimensional image of the infrared rays are captured simultaneously through a single photographing lens system, but stop numbers for the visible rays and the infrared rays can be set individually so that both exposure for the two-dimensional image-capturing CCD and exposure for the three-dimensional image-capturing CCD can be set appropriately and simultaneously. Accordingly, images formed out of distinct spectrums are captured simultaneously through a single photographing optical system at appropriate exposure.

Further, U.S. Pat. No. 5,279,397 (Barkan et al.) relates to a multi-resolution bar code reader. U.S. Pat. No. 5,279,397 supposedly facilitate operation of a bar code reader over a wider range of working angles and for a wider range of bar code densities by detecting optically encoded information using two effective sensing spots of different diameter. In one embodiment, two emitters and two detectors are used to provide two different channels optically. In another embodiment, two emitters and one detector are used. The output of the detector is multiplexed in synchronism with pulsing of the individual emitters to produce two channels. The emitters and/or the associated optics differ to provide the two different effective sensing spots and two different resolutions. In yet another embodiment, there is one light emitting element and two photodetectors, and the photodetectors comprise a central circular active area D1 and a surrounding active area D2. D1 produces an analogue signal which represents the average of reflected light received over the small active area D1. Further, analog signals from D1 and D2 are summed to approximate a signal which a larger photodiode would produce. This embodiment hence requires a rather complicated photodetector and related circuitry and processing.

SUMMARY

According to an aspect of the present disclosure, there is provided a system for imaging an object, the system comprising: a detection zone; a first unit adapted to selectively emit radiation of at least one first wavelength and radiation of at least one second, different wavelength for at least partly illuminating the object in the detection zone; a second unit adapted to capture at least partial images of the illuminated object; and an aperture placed in an optical path between the detection zone and the second unit. The aperture includes: a first, central area adapted to transmit radiation of at least the first wavelength(s) and the second wavelength(s); and a second area surrounding said first area, which second area is adapted to block (or stop or shield) radiation of the second wavelength(s), but transmit radiation of the first wavelength (s).

A system is hereby realized wherein the resolution in captured images may be changed just by changing the wavelength(s) of the illumination. When a coarser element on the object should be imaged (and subsequently recognized), radiation having the first wavelength(s) is used, which radiation is not blocked by the second area of the aperture. A large aperture is hence realized, which gives sufficient resolution for a coarser element, and which allows efficient use of the radiation (a large aperture admits more light). When a finer element on the object should be imaged (and subsequently recognized), radiation having the second wavelength(s) is used, which radiation is blocked by the second area of the aperture. A smaller aperture is hence realized, which increases the resolution and allows the finer element to be properly recognized. More light may be required due to the smaller aperture, but this can be compensated for by using several light sources for providing the second wavelength(s) radiation. Embodiments of the present disclosure may, for example, be beneficial when different light sources are more or less efficient or expensive, wherein finer details can be recognized using more efficient and/or less expensive light sources, while light sources that are less efficient and/or more costly are required for coarser details.

The first area and the second area of the aperture may be fixed, which results in a relatively simple construction.

The first unit may be adapted to separately in time emit the radiation of the first wavelength(s) and the radiation of the second wavelength(s) (i.e. not simultaneously). The first unit may for instance comprise at least one light source for emitting the first wavelength(s) and at least one light source for emitting the second wavelength(s).

The system may further comprise a controller connected to the first unit and the second unit, wherein the controller is adapted to synchronize the first unit and the second unit, such that the second unit captures at least one first image of the object while the first unit illuminates the object with radiation of the first wavelength(s) and such that the second unit captures at least one second image of the object while the first unit illuminates the object with radiation of the second wavelength(s). The controller may be realized by hardware or software or a combination thereof.

The system may be arranged such that an image captured of the object has a predetermined minimum sharpness in the detection zone. In this way, the captured image may be sufficiently sharp regardless of the distance to the object, as long as it is within the detection zone.

The system may be at least partly installed in a reverse vending machine, where it beneficially can be used to detect different markings on the object.

According to another aspect of the present disclosure, there is provided an imaging method, wherein an aperture is provided in an optical path between an object and an image-capturing unit, the aperture including a first central area adapted to transmit radiation of at least one first wavelength and at least one second different wavelength, and a second area surrounding said first area, which second area is adapted to block radiation of the second wavelength(s), but transmit radiation of the first wavelength(s). The method comprises selectively: a) illuminating the object with radiation of the first wavelength(s), and capturing by means of the image-capturing unit at least one first image of the object while the object is illuminated with radiation of the first wavelength(s); and b) illuminating the object with radiation of the second wavelength(s), and capturing by means of the image-capturing unit at least one second image of the object while the object is illuminated with radiation of the second wavelength(s), wherein illumination with radiation of the first wavelength(s) causes a lower minimum sharpness in the captured first image(s) for a given range of distances to the object along the optical path and illumination with radiation of the second wavelength(s) causes a higher minimum sharpness in the captured second image(s) for said given range. The steps a) and b) can be performed in any order, i.e. first a) and then b) or first b) and then a). This aspect of the disclosure may exhibit the same or similar features and technical effects as the previously described aspect, and vice versa.

Said given range may correspond to a detection zone in which the object is placed. In this way, the captured image may be sufficiently sharp regardless of the distance to the object, as long as the object is within the detection zone.

Step a) may include illuminating and capturing at least one image of a first marking on the object, wherein b) includes illuminating and capturing at least one image of a second marking on the object. The second marking is typically finer or more dense than the first marking.

The method may further comprise the step of analyzing the captured images for detecting or recognizing the first marking and the second marking. This analysis is typically automated, and may include comparing the imaged markings to known markings in a database.

The first and second markings may be selected from the group of: patterns, numbers, alphabetic characters, or combinations thereof. The patterns can for instance be a barcode or a particular deposit marks, and the number can be an article number, e.g.

The method may be performed in or for a reverse vending machine, and the object may be a used empty (drink) container returned to the reverse vending machine for re-use or recycling.

Yet another aspect of the present disclosure relates to use of a diaphragm in a reverse vending machine, which diaphragm has an aperture including: a first, central area adapted to transmit radiation of at least one or more first wavelengths and one or more second wavelengths; and a second area surrounding said first area, which second area is adapted to block radiation of the second wavelength(s), but transmit radiation of the first wavelength(s). This aspect of the disclosure may exhibit the same or similar features and technical effects as the previously described aspects, and vice versa. In particular, using such a diaphragm in an RVM is an effective way to detect both a coarser deposit marks and a finer bar code or article number on a returned item.

These and other aspects of the present disclosure will now be described in more detail, with reference to the appended drawings showing a currently preferred embodiment of the disclosure.

DETAILED DESCRIPTION

Figure 1:
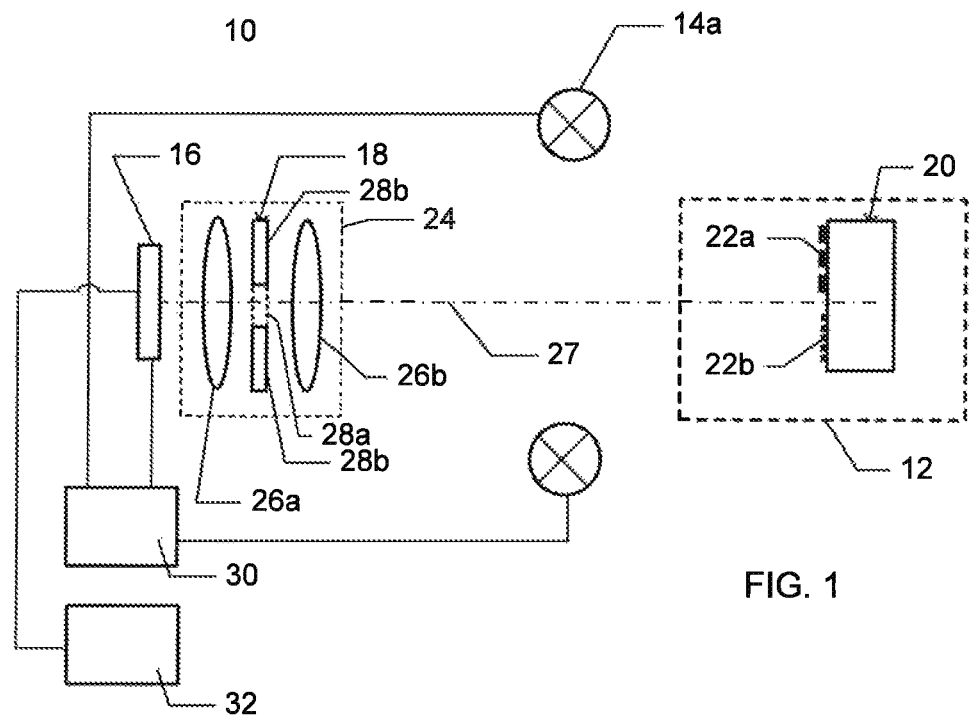
FIG. 1 is a side view of a system according to an embodiment of the disclosure.
Figure 2:
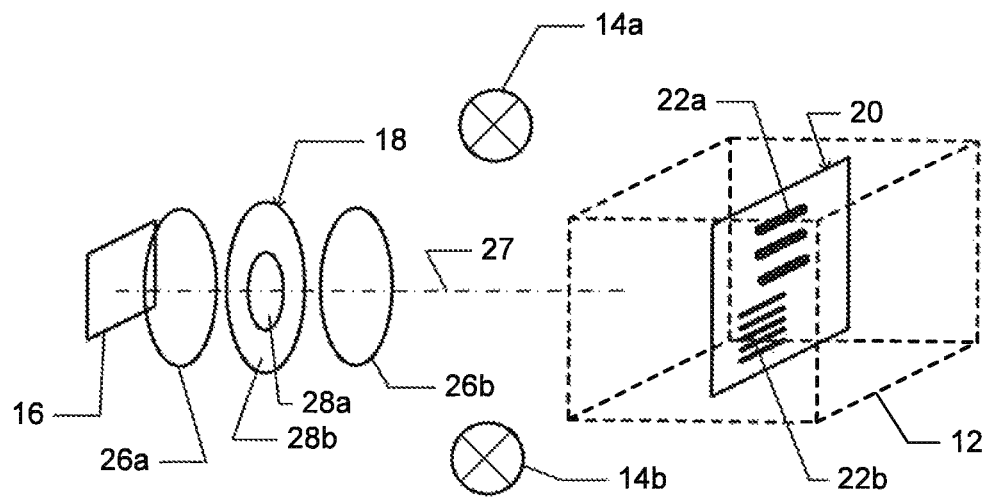
FIG. 2 is a partial perspective view of the system in FIG. 1.

A system 10 according to an embodiment of the disclosure will now be described initially with reference to FIGS. 1 and 2.

The system 10 generally comprises a detection zone 12, at least one first artificial light source 14a and at least one second artificial light source 14b (first unit), an image-capturing unit 16 (second unit), and a diaphragm with an aperture 18.

The detection zone 12 is sized for at least partly accommodating an object 20 with two different marking 22a and 22b to be imaged. The second marking 22b is typically finer or more dense or more detailed than the first marking 22a The two light sources 14a and 14b are adapted to at least partly illuminate the object 20 in the detection zone 12. In particular, the light sources 14a and 14b should illuminate the respective markings 22a and 22b on the object 20. Typically, both light sources 14a and 14b are directed toward the detection zone 12. The first light 14a source is adapted to emit radiation of at least one first wavelength. The second light source 14b is adapted to emit radiation of at least one second wavelength which is/are different than the first wavelength (s). The first light source 14a may for instance be adapted to selectively emit light having a wavelength or wavelength range A and C, while the second light source may be adapted to emit light with an intermediate wavelength or wavelength range B. The first and second wavelength(s) may for example be within the humanly visible range, but is could also be IR and/or UV, for example.

The image-capturing unit 16 is adapted to capture at least partial images of the illuminated object 20. In particular, the image-capturing unit 16 should capture images of the markings 22a and 22b on the object 20. The image-capturing unit 16 may be adapted to capture stills or video. The image-capturing unit 16 may for instance be or include a CMOS (complementary metal-oxide-semiconductor) sensor or some other image sensor. In front of the image-capturing unit 16, there is provided an objective lens 24. The objective lens 24 may include one or more lens elements 26a, 26b. The objective lens 24 is typically directed toward the detection zone 12, and it preferably has a fixed focal length. An optical path or axis 27 is defined between the detection zone 12 and the image-capturing unit 16. The optical path 27 can be straight as in FIGS. 1 and 2, capturing unit 16 and objective lens 24 are preferably placed at a fixed distance from the detection zone

12. Also, the light sources 14*a*,*b* and the image-capturing unit 16 are preferably placed on the same side of the detection zone 12, such that the image-capturing unit 16 is not shadowed by the object 20 when the latter is illuminated by the light sources 14*a*,*b*.

The diaphragm with the aperture 18 is placed in the optical path 27 between the detection zone 12 and the image-capturing unit 16. A diaphragm is generally a device that limits the aperture of a lens or optical system, and an aperture may be defined as the opening in the lens or optical system that admits light.

Figure 3:
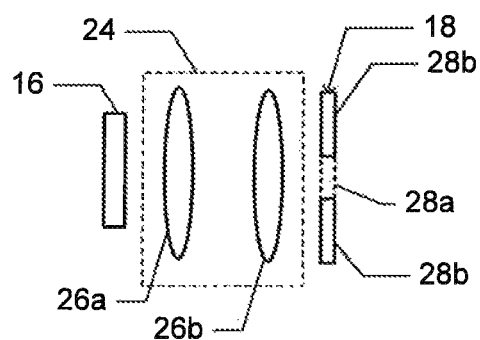
FIG. 3 is a partial side view showing an alternative position of the aperture.

In the present system, the aperture 18 is typically included in the objective lens 24. The aperture 18 may for instance be placed between two lens elements 26*a*, 26*b*, as in FIGS. 1 and 2. Alternatively, the aperture 18 can be placed outside the objective lens 24, for instance in front of the objective lens 24, as shown in FIG. 3.

Figure 4:
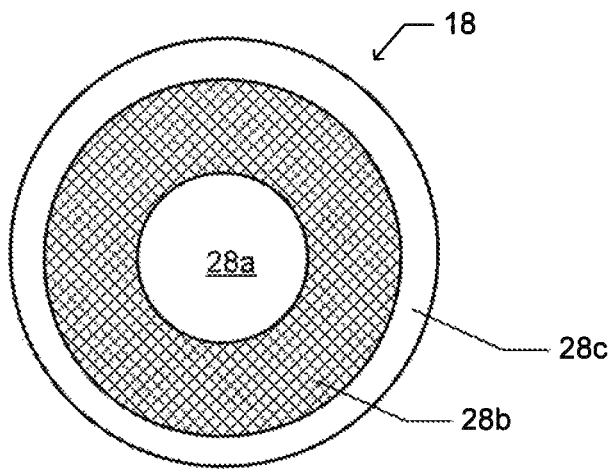
FIG. 4 is a front view of an aperture used e.g. in the system of FIG. 1.

As also shown in FIG. 4, the aperture 18 includes a first, central area 28*a* adapted to transmit radiation of at least the first wavelength(s) and the second wavelength(s). 'Transmit' means here admitting the passage of radiation (light). The aperture 18 also includes a second area 28*b* surrounding said first area 28*a*, which second area 28*b* is adapted to block radiation of the second wavelength(s), but transmit radiation of the first wavelength(s). The first area 28*a* may be circular, while with second area 28*b* is ring-shaped. Further, the second area 28*b* may be formed by a color filter, while the first central area 28*a* simply may be a hole. Preferably, the first area 28*a* and the second area 28*b* of the aperture 18 are fixed (cf. an iris which is an adjustable diaphragm for regulating the size of the aperture). The outer perimeter of the second area 28*b* may be defined by a completely light-blocking stop 28*c*.

The system 10 may further comprise a controller 30 connected (wired or wireless) to the two light sources 14*a* and 14*b* and to the image-capturing unit 16. The controller 30 is generally adapted to synchronize the operation of the light sources 14*a*, 14*b* and the image-capturing unit 16, as will be described further below.

The system 10 may further comprise an analyzer 32 connected (wired or wireless) to the image-capturing unit 16. The analyzer 32 is generally adapted to analyze images captured by the image-capturing unit 16 for detecting or recognizing the markings 22*a*, 22*b* on the imaged object 20, as will be described further below.

An example of operation of the system 10 will now be described with further reference to FIGS. 5*a* and 5*b*. The reference signs from FIG. 1 are not repeated in FIGS. 5*a* and 5*b*.

In operation, the object 20 with the two markings 22*a* and 22*b* is introduced at least partly into the detection zone 12. The object 20 is oriented so that at least the markings 22*a* and 22*b* may be illuminated by the light sources 14*a* and 14*b* and subsequently imaged by the image-capturing unit 16. The system may comprise automatic orientation means (not shown) to perform such orientation of the object 20.

Figure 5A:
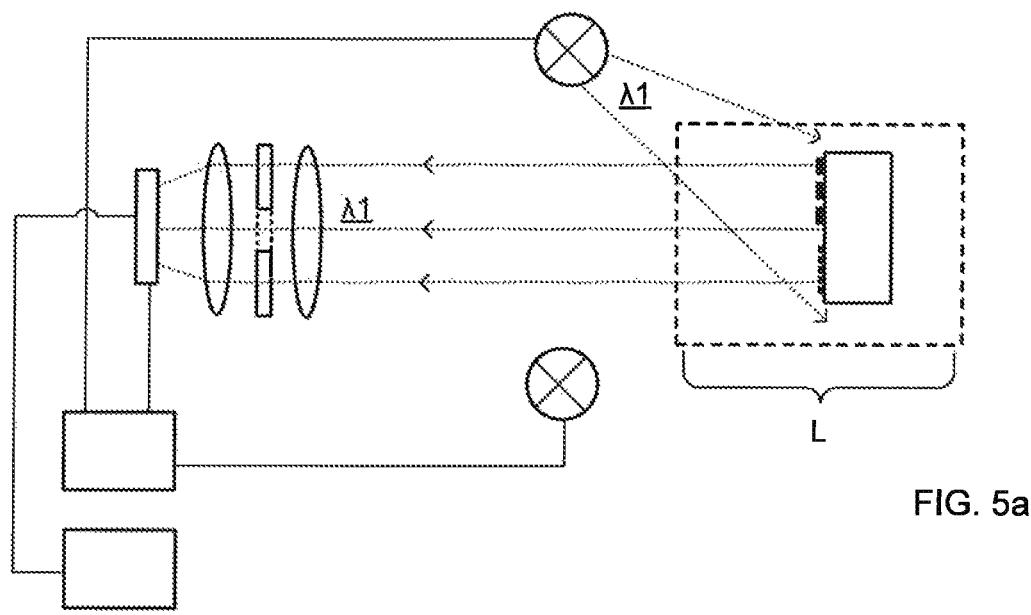
FIG. 5a-5b illustrate an example of operation of the system in FIG. 1.

The object 20 in the detection zone 12 is first subjected to radiation $\lambda 1$ of the first wavelength(s) from the first light source 14*a*, such that at least the first marking 22*a* is illuminated with the radiation $\lambda 1$ (FIG. 5*a*). At least one first image of the thus illuminated first marking 22*a* is captured by the image-capturing unit 16. Radiation $\lambda 1$ reflected off the object 20/first marking 22*a* is transmitted through both the first area 22*a* and the second area 22*b* of aperture 20.

Figure 5B:
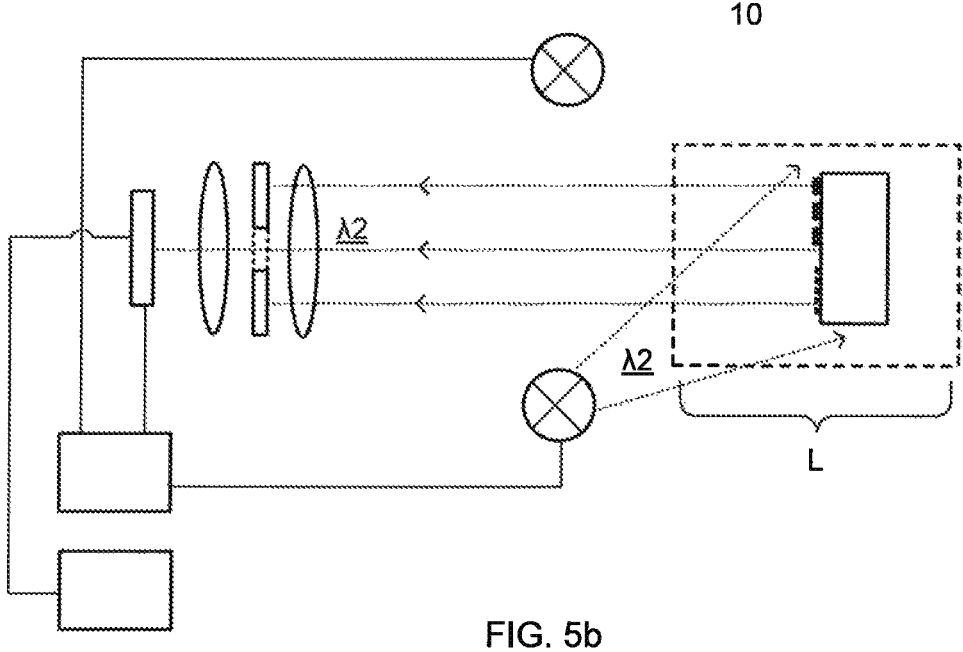

Thereafter, the first light source 14*a* is turned off, and the object 20 is instead subjected to radiation $\lambda 2$ of the second wavelength(s) from the second light source 14*b*, such that at least the second marking 22*b* is illuminated with the radiation $\lambda 2$ (FIG. 5*b*). At least one second image of the thus illuminated second marking 22*b* is captured by the image-capturing unit 16. Since radiation $\lambda 2$ reflected off the object 20/second marking 22*b* is only transmitted through the first area 22*a* but not through the second area 22*b* of aperture 20, the effective aperture is smaller than that in FIG. 5*a*.

The operation of the two light sources 14*a*, 14*b* and the image-capturing unit 16 is synchronized by the controller 30. Namely, the controller 30 sends instructions such that the image-capturing unit 16 captures the first image(s) while the first light source 14*a* illuminates the object 20 (and the second light source 14*b* is off), and such that the image-capturing unit 16 captures the second image(s) while the second light source 14*b* illuminates the object 20 (and the first light source 14*a* is off). The order of operation can be reversed, so that first the second light source 14*b* and then the first light source 14*a* are selectively activated for illuminating the object 20.

The first and second captured images have different resolutions, as will be explained more in the following.

A captured image's depth of focus (DoF) may be defined as a range of distances of the object 20 in front of the objective lens 24 measured along the optical axis 27 throughout which the image has acceptable sharpness. The objective lens 24 can precisely focus at only one distance at a time, but the decrease in sharpness is gradual on each side of the focused distance, so that within the DoF, the unsharpness is so insignificant that it becomes "acceptable sharpness" for the viewer, in this case the image-capturing unit 16 and the subsequent analyzer 32.

Figure 6:
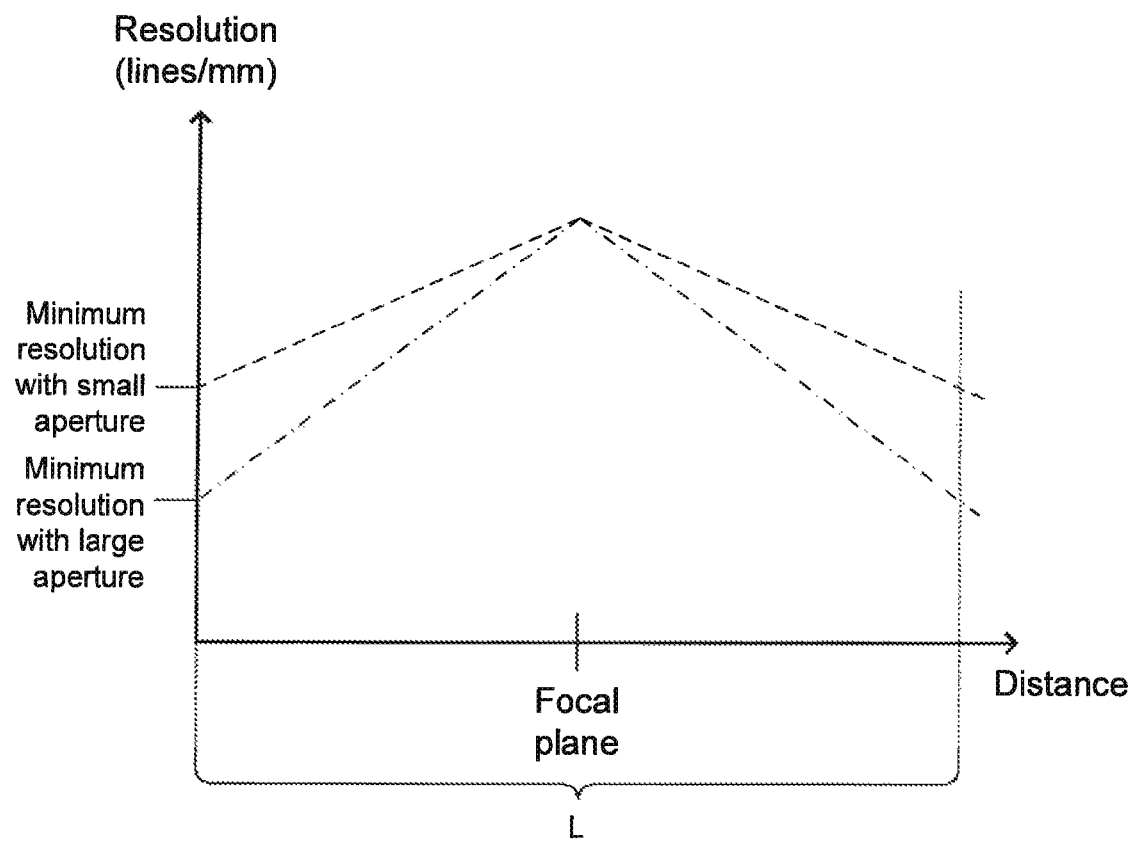
FIG. 6. is a graph showing the relationship between resolution (sharpness) and distance for different apertures.

In the present system 10, said range of distances corresponds the length L of the detection zone 12 along the optical axis 27. To this end, it will be appreciated that an image captured of the object 20 illuminated by radiation of the first wavelength(s) $\lambda 1$ (=larger aperture/opening 18) may have a lower minimum sharpness in the range L corresponding to the detection zone than an image captured when the object is illuminated with radiation of the second wavelength(s) $\lambda 2$ (=smaller aperture/opening 18), ceteris paribus, since the sharpness drops quicker from the focused distance (focal plane) when a larger aperture 18 is used. This is illustrated in FIG. 6. The sharpness and hence the resolution of the captured images are therefore different depending merely on the illuminating wavelength(s).

The system 10 is designed such an image captured of the object 20 has a predetermined minimum sharpness in the detection zone 12, whereby the captured image may be sufficiently sharp regardless of the distance to the object 20, as long as the object 20 is within the detection zone 12. The minimum sharpness is typically at the closest or furthest distance of "acceptable sharpness", i.e. at the proximal or distal end of the detection zone 12, when the focused distance or focal plane is within the detection zone 12. The (lower) minimum sharpness when the object 20 is illuminated with radiation $\lambda 1$ should provide an image resolution that allows the coarser marking 22*a* to be properly recognized, while the (higher) minimum sharpness when the object 20 is illuminated with radiation $\lambda 2$ should provide an image resolution that allows the finer marking 22*b* to be properly recognized. The resolution for detecting the coarser marking 22*a* may for instance be about 2-3 lines per mm, and the resolution for detecting the finer marking 22*b* may be about 6-8 lines per mm. The predetermined minimum sharpness may be achieved by appropriately selecting at least one of the distance between the detection zone 12 and the objective lens 24, the focal length of the objective lens 24, the size of the first and second areas of the aperture 18, and format size of the image-capturing unit 16.

Captured images may be analyzed by the analyzer 32, for detecting or recognizing the first marking 22a and the second marking 22b. This analyzer 32 may for instance compare the imaged markings to known markings in a database (not shown). Since the first marking 22a is coarse, the lower resolution in the captured first image(s) will be sufficient to recognize the marking. That is, even if the marking is somewhat out of focus in the capture image, it may still be enough for recognizing the marking. On the other hand, the finer second marking 22b would typically not be recognized in the first image(s), unless it happens to be exactly in focus. However, since the second images have greater resolution, the finer second marking 22b may be readily recognized by the analyzer in the second image(s), regardless of its position in the detection zone 12.

The present system 10 and method is preferably used in relation to a reverse vending machine (RVM). However, other applications are envisaged.

Figure 7:
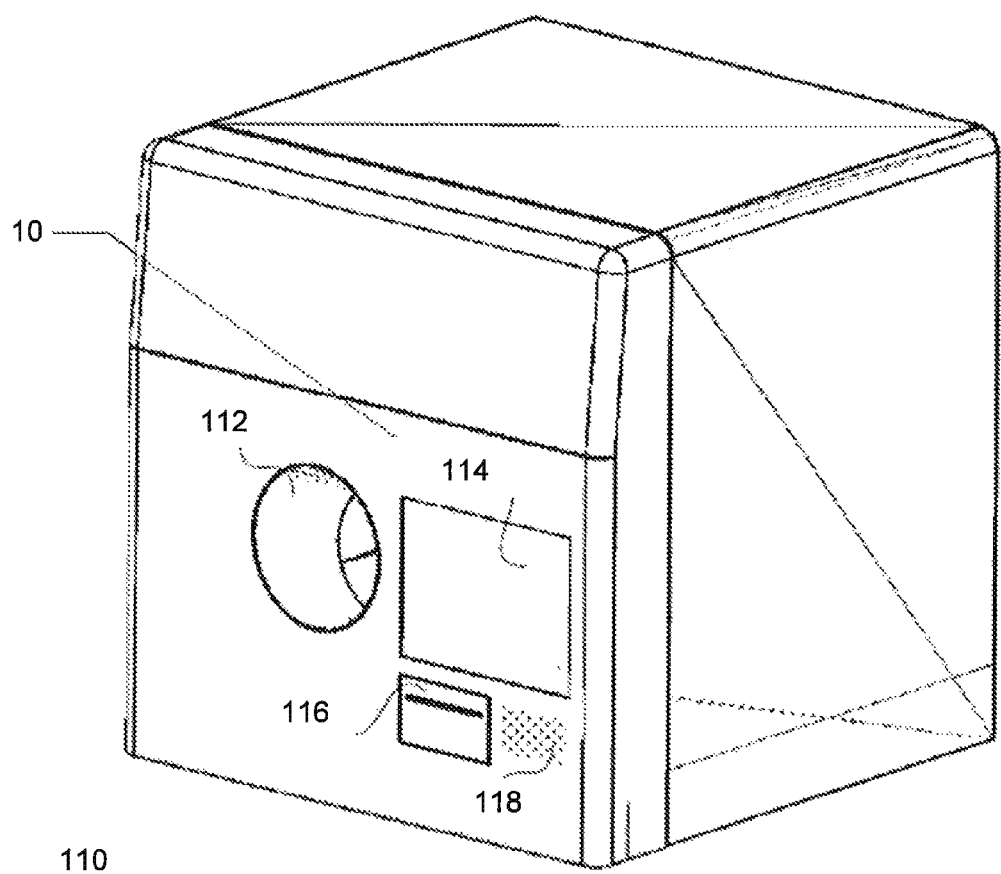
FIG. 7 is a perspective view of a reverse vending machine in relation to which embodiments of the present disclosure may be used.

FIG. 7 illustrates a reverse vending machine 110 in relation to which embodiments of the present disclosure may be used. The machine 110 can be located for example in a store that accepts receipt of returnable objects (e.g. empty containers) and positioned such that it is easily accessible to customers with returnable objects, and also such that returnable objects can be conveniently stored at the rear of the machine, or in a location to which they can be easily transported from the rear of the machine, either automatically or manually.

The front of the machine includes an opening 112 into which returnable objects can be entered by the customer. Also provided is a display for providing messages to the customer and an input device allowing the customer to enter simple commands, for example indicating that the customer has entered all their returnable items. As illustrated in FIG. 7, the display and the input device may be combined in the form of a touch screen 114. Alternatively, the display and the input device may be separate devices. The front of the machine 110 may also include a printing device 116 from which a receipt may be delivered to the customer. However, alternative ways of providing the customer with a receipt can also be contemplated, including transmission of an electronic receipt, over a wireless or wired network, to be received by an electronic device such as a cellphone or smartphone in the possession of the customer. The electronic receipt may also be sent directly to a checkout counter, or in the form of electronic payment to the customer's account. The customer may also be invited to select a charity to which the value of the returned items can be donated, using the input device functionality of the touch screen 114.

The machine 110 may also include a loudspeaker 118 or some other form of audible or visual alarm that can be used to issue notifications to the customer or to an operator for example in the case of a malfunction, storage capacity overflow or some other issue that needs attention.

When a customer enters a returnable object 20 into the reverse vending machine 110, the object 20 must be recognized, its authenticity verified and the appropriate value must be determined. To this end, the present system 10 may be at least partly installed in the reverse vending machine 110, as schematically illustrated in FIG. 7.

When the object 20 is returned it is entered through the opening 112 into a chamber, which chamber features the above described detection zone 12. The light sources 14a and 14b, the image-capturing unit 16, the aperture 18, and the objective lens 24 are provided in the machine 110 adjacent to the chamber/detection zone 12. The controller 30 and the analyzer 32 can also be installed in the machine 110, but at least one of the them could alternatively be provided outside the machine 110.

When the object 20 has entered the detection zone 12, the system 10 is operated and the above described methodology is performed to capture images of the first and second marking 22a and 22b on the object 20, and for detecting or recognizing both the markings from the captured images. If the detected or recognized markings are accepted, the object may be transported towards the rear of the machine 110 where it can be stored or subject to further processing such as for example sorting, further transportation, and destruction. On the other hand, if the detected or recognized markings are not accepted, the object is typically returned to the customer.

The person skilled in the art will realize that the present disclosure by no means is limited to the embodiment(s) described above. On the contrary, many modifications and variations are possible within the scope of the appended claims.

The invention claimed is:

1. A reverse vending machine having at least partly installed therein a system for imaging an object, the system comprising:
   a detection zone;
   a first unit (14a, 14b) adapted to selectively emit radiation of at least one first wavelength and radiation of at least one second, different wavelength for at least partly illuminating the object in the detection zone, wherein the first unit is adapted to separately in time emit the radiation of the first wavelength(s) and the radiation of the second wavelength(s);
   a second unit adapted to capture at least partial images of the illuminated object;
   an aperture placed in an optical path between the detection zone and the second unit, wherein the aperture includes:
      a first, central area adapted to transmit radiation of at least the first wavelength(s) and the second wavelength(s); and
      a second area surrounding said first area, which second area is adapted to block radiation of the second wavelength(s), but transmit radiation of the first wavelength(s); and
   a controller connected to the first unit and the second unit, wherein the controller is adapted to synchronize the first unit and the second unit, such that the second unit captures at least one first image of the object while the first unit illuminates the object with radiation of the first wavelength(s) and such that the second unit captures at least one second image of the object while the first unit illuminates the object with radiation of the second wavelength(s).

2. A reverse vending machine according to claim 1, wherein the first area and the second area of the aperture are fixed.

3. A reverse vending machine according to claim 2, arranged such that an image captured of the object has a predetermined minimum sharpness in the detection zone.

4. A reverse vending machine according to claim 1, arranged such that an image captured of the object has a predetermined minimum sharpness in the detection zone.

5. An imaging method performed in or for a reverse vending machine, wherein an aperture is provided in an optical path between an object and an image-capturing unit, the aperture including a first central area adapted to transmit radiation of at least one first wavelength and at least one second different wavelength, and a second area surrounding said first area, which second area is adapted to block radiation of the second wavelength(s), but transmit radiation of the first wavelength(s), and wherein the method comprises selectively:

a) illuminating the object with radiation of the first wavelength(s), and capturing by means of the image-capturing unit at least one first image of the object while the object is illuminated with radiation of the first wavelength(s); and b) illuminating the object with radiation of the second wavelength(s), and capturing by means of the image-capturing unit at least one second image of the object while the object is illuminated with radiation of the second wavelength(s), wherein illumination with radiation of the first wavelength(s) causes a lower minimum sharpness in the captured first image(s) for a given range (L) of distances to the object along the optical path and illumination with radiation of the second wavelength(s) causes a higher minimum sharpness in the captured second image(s) for said given range.

6. A method according to claim 5, wherein said given range corresponds to a detection zone in which the object is placed.

7. A method according to claim 6, wherein a) includes illuminating and capturing at least one image of a first marking on the object, and wherein b) includes illuminating and capturing at least one image of a second marking on the object.

8. A method according to claim 5, wherein a) includes illuminating and capturing at least one image of a first marking on the object, and wherein b) includes illuminating and capturing at least one image of a second marking on the object.

9. A method according to claim 8, further comprising:
    analyzing the captured images for detecting or recognizing the first marking and the second marking.

10. A method according to claim 9, wherein the first and second markings are selected from the group of: patterns, numbers, alphabetic characters, or combinations thereof.

11. A method according to claim 8, wherein the first and second markings are selected from the group of: patterns, numbers, alphabetic characters, or combinations thereof.

12. A method according to claim 5, wherein the object is a returned container.

\* \* \* \* \*